No. 877,706. PATENTED JAN. 28, 1908.
F. DUFFY.
PISTON ROD PACKING.
APPLICATION FILED SEPT. 11, 1907.
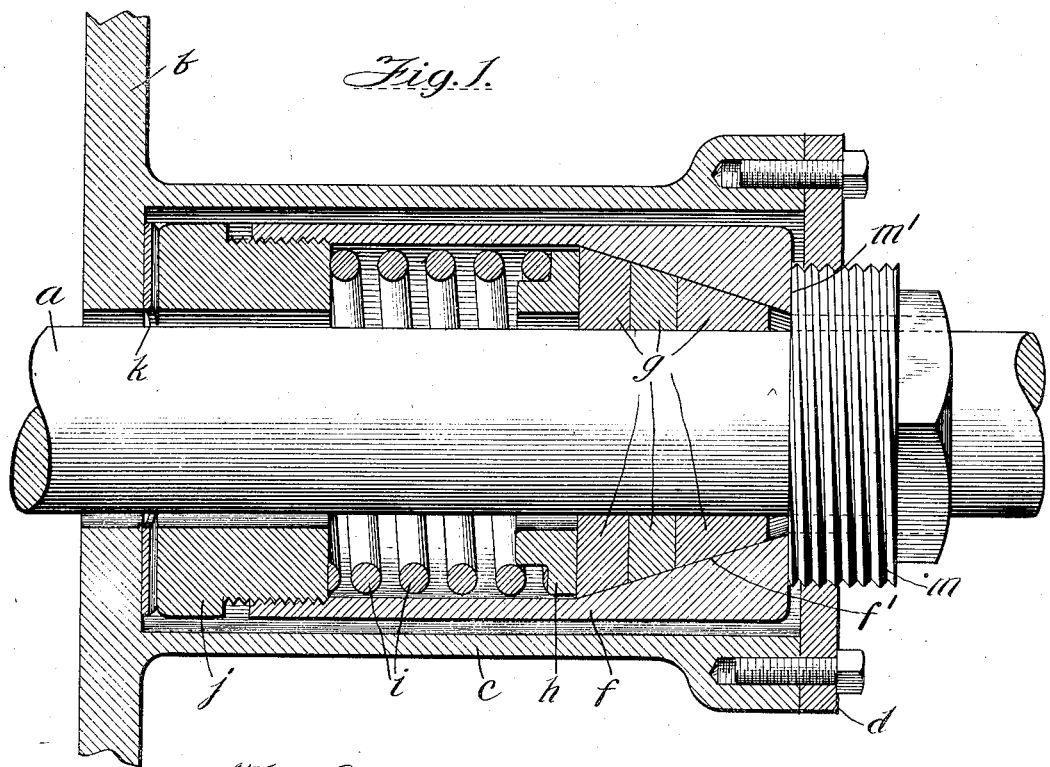
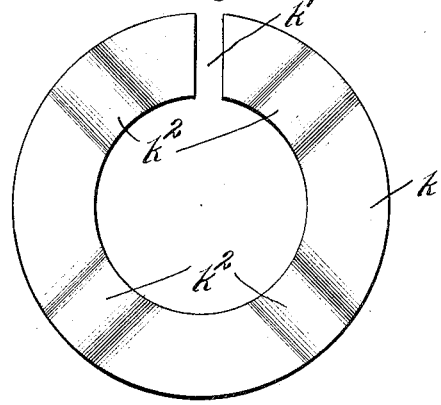
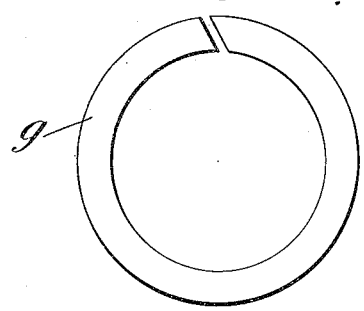
Witnesses:
Inventor:
Francis Duffy
By Cheever & Cox Attys

UNITED STATES PATENT OFFICE.

FRANCIS DUFFY, OF CHICAGO, ILLINOIS.

PISTON-ROD PACKING.

No. 877,706.

Specification of Letters Patent.

Patented Jan. 28, 1908.

Application filed September 11, 1907. Serial No. 392,397.

*To all whom it may concern:*

Be it known that I, FRANCIS DUFFY, a citizen of the United States, residing at Chicago, in the county of Cook and State of Illinois, have invented a certain new and useful Improvement in Piston-Rod Packing, of which the following is a specification.

My invention relates to boxes or glands for pistons, valve rods and the like, and for convenience I refer to it by the general term of "piston rod packing".

The object of the invention is to provide a construction such that the piston rod or valve rod may be permitted to vibrate to a limited extent without straining or damaging the stationary parts of the device. In a certain sense the box may be said to have a floating inner casing, the packing being consequently movable in a stationary casing and thereby permitting the packing to follow the vibratory movements of the piston or valve rod without contacting the stationary parts. This feature renders the device particularly applicable to railway locomotives and other machines where there is considerable vibration.

Another object of the invention is to provide a construction such that the packing may be firmly held in place although subjected to a pressure much less than that ordinarily employed in like devices. This decreases the rate of wear of the packing and consequently increases its life.

A third object is to provide an independent inner casing for containing the packing spring in such manner that the casing together with the packing and packing spring may be bodily removed from the outer casing or may be inserted thereinto without altering the adjustment of the spring.

A fourth object of the invention is to provide certain details of construction whereby the parts may be few in number, simple in construction, and readily assembled and disassembled.

I obtain my objects by the mechanism illustrated in the accompanying drawings, which Figure 1 is a side view of the complete device, chiefly in longitudinal section, Fig. 2 is a face view of the spring washer which I prefer to employ, Fig. 3 is an edge view of said washer, and Fig. 4 is a face view of one of the packing rings.

Similar reference characters indicate like parts throughout the several views.

Although the construction here shown is applicable both to piston rods and valve rods I will, for convenience, refer to the rod $a$ as a piston rod and will consider that the wall $b$ is the end or head of a steam cylinder. The stationary casing $c$ is rigidly secured to cylinder head $b$ and is preferably integral therewith, as shown. Said casing is cylindrical and contains the sleeve $f$ which has a cylindrical exterior surface, and is smaller than the interior of the casing $c$. This permits movement of said sleeve within said casing.

At the outer end of sleeve $f$ is a cone taper $f^1$ adapted to receive the split cone taper packing rings $g$. Behind the rings $g$ it is desirable to provide a follower ring $h$ which is acted upon by a compression spring $i$. At the inner end of sleeve $f$ is a sleeve base $j$ which preferably screws into said sleeve in order that it may be adjusted with reference thereto to regulate the strain in the spring $i$ and regulate the total acting length of said sleeve. Interposed between the cylinder head $b$ and sleeve $j$ is a spring device, for example, washer $k$ which is split at $k^1$ and has corrugations or flutings $k^2$, as clearly shown in Figs. 2 and 3. The outer end of the stationary casing $c$ is closed by means of a screw member which affords means for regulating the pressure between the stationary and the vibratory or floating parts of the device. In the preferred construction a plate $d$ is bolted onto the casing $c$ and receives an exteriorly threaded nut $m$ which encircles rod $a$ and is bored larger than the diameter of rod $a$ in order to permit the latter to vibrate. The parts are so arranged that nut $m$ bears upon the outer end of sleeve $f$ at the annular surface $m^1$. In order to prevent leakage between the adjacent parts, the annular surfaces on both of the parts $f$ and $m$ are smoothly finished to form what is known as a ground joint.

In operation the nut $m$ is screwed down tight enough to partly compress the corrugated or fluted washer $k$. As said washer is resilient, the consequence is that the sleeve $f$ and sleeve base $j$ which, together, form an inner or floating casing, are held in position by the friction set up between base $j$ and washer $k$ at one end and sleeve $f$ and nut $m$ at the other end of the device. The force of spring $k$ holds the sleeve $f$ and the nut $m$ in close contact to prevent leakage past the contacting surfaces. As the outer end surfaces of the sleeve $f$ and base $j$ are transverse to the axis of rod $a$, the inner casing, together with the spring and packing therein, is free to vibrate within the outer casing $c$ without inducing any strain upon said outer casing other than that occasioned by the rubbing of the movable upon the stationary surfaces. This friction may be regulated in amount by screwing the nut $m$ in the proper direction.

Inasmuch as the sleeve $f$ and base $j$ are screwed together and move as a single piece within the outer casing, they constitute what may be considered a self contained inner casing as a result, this inner casing and contents may be removed bodily from the stationary casing without taking the members apart or disturbing the adjustment of the spring pressure upon the packing. Both the action and reaction of the spring are taken up or absorbed by the inner casing itself. Moreover, the pressure of the nut $m$ upon said inner casing may be increased to any extent desired by increasing the pressure exerted by the sleeve base $j$ upon the spring $i$. Consequently a light spring may be employed, this spring being merely sufficient to prevent the packing $y$ from receding from the cone taper $f^1$. Consequently the packing is under very light strain which results in a low rate of wear and proportionately increases the period during which it may be used without being renewed or even examined. The result is not only a saving in packing but a saving in labor, for this device when once adjusted may be left for a great length of time without inspection.

What I claim as new and desire to secure by Letters Patent is:

1. In a device of the class described, the combination of a longitudinally reciprocating rod, a stationary casing and a self contained floating inner casing containing packing and adapted to vibrate in unison with said rod.

2. In a device of the class described, the combination of a longitudinally reciprocating rod, a stationary casing, a self contained inner casing containing packing and being transversely movable within said outer casing, and means at the end of said outer casing adapted to contact the inner casing upon a surface transverse to said rod for preventing leakage and permitting transverse movements of said inner casing.

3. In a device of the class described, the combination of a longitudinally reciprocating rod, a stationary casing, a self contained inner casing containing packing and being transversely movable within said outer casing, and means for closing said outer casing, said means including a nut which is adjustable relatively to said outer casing and is adapted to contact the inner casing upon a surface transverse to said rod.

4. In a device of the class described, the combination of a longitudinally reciprocating rod, a stationary casing, an independent self contained inner casing inclosing said rod, packing within said inner casing, and yielding means interposed between the ends of the inner and outer casings.

5. In a device of the class described, the combination of a longitudinally reciprocating rod, a stationary casing, an independent self contained inner casing inclosing said rod, means within said inner casing for preventing the escape of fluid past inner casing, and a nut and spring washer for yieldingly holding said inner casing in frictional contact with said outer casing.

6. In combination, a fluid chamber, an outer casing communicating therewith, an inner casing movable within said outer casing, a reciprocating rod passing from said fluid chamber through said casings, packing within said inner casing, spring urged to make close contact with said rod and with said inner casing, and means adapted to make frictional contact with said outer casing and with said inner casing for permitting relative movement thereof and for preventing escape of fluid between them.

7. In combination, a fluid chamber, an outer casing communicating therewith, a self contained inner casing movable within said outer casing, a reciprocating rod passing from said fluid chamber through said casings, packing within said inner casing, spring urged to make close contact with said rod and with said inner casing, and a nut screwing into one casing and making frictional contact with the other for permitting relative movement of said casings and for preventing escape of fluid between them.

8. In combination, a fluid chamber, an outer casing rigid therewith and communicating therewith, a self contained inner casing movable within said outer casing, a reciprocating rod passing through said casings, packing within said inner casings, a spring washer interposed between the inner and outer casing at one end of the inner casing and means at the other end of the inner casing for forcing said inner casing against said washer, and for making frictional contact with both the inner and outer casing for preventing leakage.

9. In combination, a fluid chamber, an outer casing rigid therewith and communicating therewith, a self contained inner casing movable within said outer casing, a reciprocating rod passing through said casings, packing within said inner casing, a spring washer interposed between the inner and outer casing at one end of the inner casing and a nut at the other end of the inner casing screwing into one of said casings and making joint with the other of said casings for the purpose described.

10. In combination, a stationary casing communicating with a source of fluid pressure, a reciprocating rod passing through said casing, a sleeve movable within said outer casing, a sleeve base rigidly and detachably secured of said sleeve, packing within said sleeve, a spring washer between said sleeve base and one end of said casing and a nut screwed into the other end of said casing and making a friction joint with said sleeve, said friction joint being in a plane transverse to said rod whereby relative movement between said nut and said sleeve is permitted, said sleeve joint preventing leakage between the contacting surfaces.

11. In combination, a fluid chamber, a stationary casing rigid therewith and communicating therewith, a sleeve movable within said stationary casing, a sleeve base screwing into said sleeve, packing within said sleeve, the compression of the packing depending upon the adjustment of said sleeve base in said sleeve, a spring washer between said sleeve base and one end of said casing, a nut at the other end of said casing for preventing leakage from between said casing and said sleeve, said nut making a ground joint with said sleeve upon a plane surface transverse to the axis of the device, said rod passing through said sleeve, sleeve base and nut.

12. In combination, a fluid chamber, a stationary casing rigid therewith and communicating therewith, a sleeve movable within said stationary casing, said sleeve having a cone taper therein, a sleeve base screwing into said sleeve, conically split ring packing feeding within the cone taper and said sleeve, a spring interposed between said packing and said sleeve base, a spring washer between said sleeve base and said stationary casing, a nut screwing into said stationary casing and adapted to contact an annular plane surface upon said sleeve for preventing movement of the parts within said casing and preventing leakage, and a reciprocating rod extending through said sleeve, sleeve base and nut.

In witness whereof I have hereunto subscribed my name in the presence of two witnesses.

FRANCIS DUFFY.

Witnesses:
  Q. J. SWOBODA,
  G. A. MACDOWELL.